C. E. LOETZER.
HOSE COUPLING.
APPLICATION FILED FEB. 24, 1906.
919,444.
Patented Apr. 27, 1909.
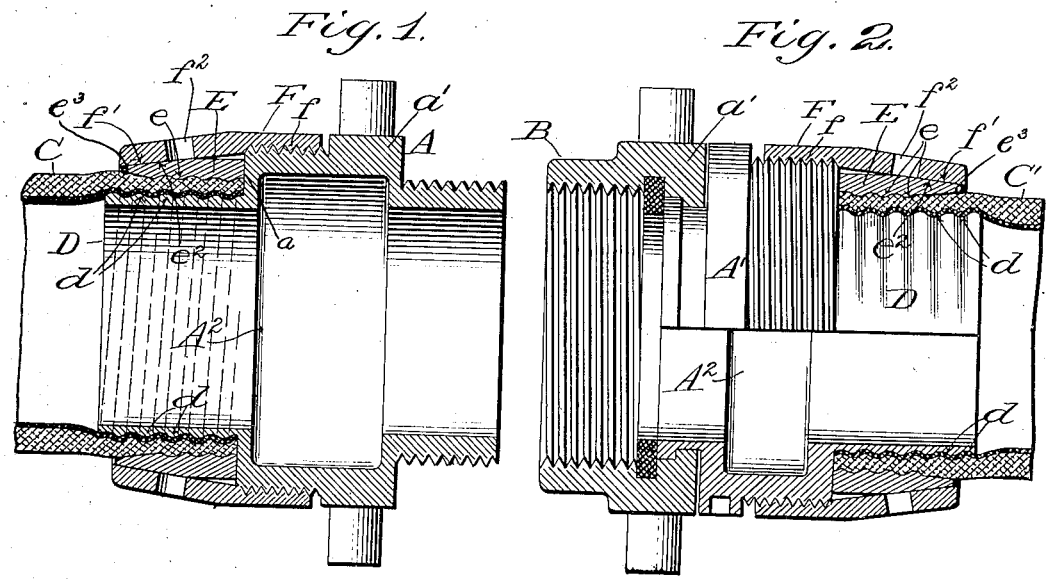
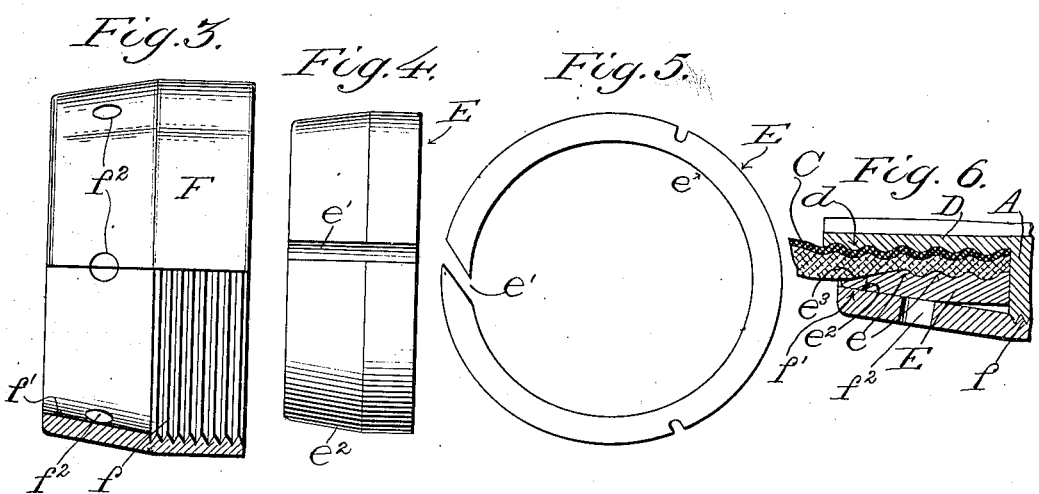
Witnesses
All Brindine
Jos. F. Collins.
Inventor
Christian E. Loetzer
By Julian C. Dowell
his Attys.

UNITED STATES PATENT OFFICE.

CHRISTIAN E. LOETZER, OF SAYRE, PENNSYLVANIA.

HOSE-COUPLING.

No. 919,444.　　　Specification of Letters Patent.　　　Patented April 27, 1909.

Application filed February 24, 1906. Serial No. 302,759.

*To all whom it may concern:*

Be it known that I, CHRISTIAN E. LOETZER, a citizen of the United States, residing at Sayre, in the county of Bradford and State of Pennsylvania, have invented certain new and useful Improvements in Hose-Couplings; and I do hereby declare the following to be a full, clear, and exact description of the invention, such as will enable others skilled in the art to which it appertains to make and use the same.

This invention relates to detachable hose-couplings, and particularly to couplings for hose intended for use under heavy pressure, such as fire-hose.

The invention has reference more especially to the means of attaching the ends of the flexible hose-sections to the coupling-heads. Devices for this purpose are commonly known as "hose-binders."

The binders for fire-hose must be exceptionally strong and secure, in order to withstand the pulling strain caused by the internal pressure and prevent the hose from separating from its coupling-head—an accident which in service might result in grave disaster. For this reason, fire-hose binders have hitherto been constructed wherein the end of the hose is directly grasped and secured between an inner annular wedge or spreader and an outer binding-ring or nut having a threaded engagement with the coupling-head, the wedge having exterior annular teeth or stepped abutments and the binding-member or outer ring having similar interior teeth or abutments for engaging or embedding in the hose and insuring the retaining power of the binder. In practice such devices have proven very defective, first because of the difficulty of securing the end of the hose evenly between the wedge and outer binding-member or nut, since the screwing of the latter to the coupling-head has the tendency of bunching or buckling the end portion of the hose which is engaged and being drawn between said wedge and nut; chiefly, however, because of the mutilation and wear of the hose, since the effect of the engagement of the teeth in the hose as it is engaged and compressed between the wedge and nut is literally to chew up the hose, especially its inner rubber lining, frequently to such an extent as to cause rupture and allow leakage, while furthermore the great internal pressure in service, operating in conjunction with the abrupt ridges engaging the hose, tends to cut and rupture the same, so that the hose is liable to breakage and even to separation or blowing off from its coupling-head.

Now the object of my invention is to produce in conjunction with a hose-coupling a perfectly efficient binding device, adapted to hold the hose to the coupling-head with absolute security, but without the slightest mutilation of the hose or its rubber lining, and moreover without materially stiffening and weakening the neck of the hose at its juncture with the coupling. These results are attained by means substantially as hereinafter described and particularly pointed out in the claims.

In the accompanying drawings, which form a part of this specification, Figure 1 is a longitudinal section of a coupling-head with the end of its hose section attached thereto by means embodying my invention, parts being broken away. Fig. 2 is a central longitudinal vertical section of the companion coupling and with the end of its hose section attached thereto. Fig. 3 is a side view partly in section of the binding-nut. Fig. 4 is a side view of the split retaining-ring. Fig. 5 is an end or face view of said ring. Fig. 6 is an enlarged detail view of a fragmentary section through the hose-binder.

The coupling-head A of Fig. 1 is adapted for detachable coupling to the companion coupling-head A' of Fig. 2, the former coupling-head A being a male-member adapted for engagement with the female coupling-sleeve B swiveled on the latter member A'. Otherwise the coupling-heads are substantially alike, and the following description will apply to both coupling-heads, which together make the complete coupling for uniting the adjacent ends of the hose or pipe sections C and C'.

Each coupling-head, A and A', has an integral nipple D, of smaller diameter than the head, adapted for insertion into the end of its hose section, C or C'. Said nipple D is preferably slightly larger exteriorly than the inside diameter of the hose, for the purpose of enlarging or spreading the end of the hose. The nipple is also exteriorly provided with a continuous spiral groove, as indicated at $d$, adapting the nipple to be easily worked into the hose in the manner of a screw, also providing closely arranged corrugations or alternating grooves or ridges for obtaining a better hold within the hose. However, these corrugations or grooves and ridges are not such as to bite, cut or mar the hose, but the grooves and ridges are rounded, the grooves being moreover comparatively shallow, and are adapted to grip the hose interiorly without the slightest injury to the rubber lining. The nipple is desirably inserted for its full length into the hose, the end of which may abut against the annular shoulder $a$ of the coupling-head. Surrounding and clasping the hose around the nipple is a split elastic or expansible and contractible retaining-ring E, which is intended to be slipped over the end of the hose before the latter is attached to the nipple D and then to be distended and forced over the nipple so as to clasp the end portion of the hose thereon. This retaining-ring E is also interiorly corrugated, as indicated at $e$, or preferably formed with an internal spiral groove, for obtaining a better hold upon the hose, without however mutilating the same; while the spiral arrangement of the grooves also facilitates the working of the ring onto the hose in the first instance and afterward back onto the end portion of the hose which is fitted on the nipple, the retaining-ring being provided with any suitable means whereby it can be firmly grasped to screw it back and forth; as for example the peripheral depressions shown in Fig. 5 which can be engaged by a spanner or similar device. The cross-cut $e'$ of the ring is preferably made on a pronounced bevel or non-radially, as shown in Fig. 5, whereby in the event of a complete contraction of the ring its beveled extremities may yet ride oppositely one upon the other to allow a still further contraction if necessary, although, as a matter of fact, the cut $e'$ is of such width that a full contraction of the ring would not usually occur in service. An abutment or stop for the front end of the ring is afforded by the annular shoulder $a$ before alluded to. Exteriorly said retaining-ring E is conoidal or tapered toward its rear end, or as shown it may have a rear conoidal portion $e^2$, providing an annular wedge or bevel.

A binding-member or nut F is screwed on the coupling-head behind a flange $a'$ thereof, the threaded engagement between the nut and coupling-head being indicated by the symbol $f$. Like the retaining-ring, said binding-nut is intended to be slipped over the end of the hose, before attachment thereof to the nipple of the coupling-head, also before placing the retaining-ring on the hose. Said binding nut F, which of course is larger internally than the outside diameter of the retaining-ring E, has a rearward internal conoidal or annular beveled portion $f'$ coacting with the bevel $e^2$ of the retaining-ring. After the nipple D is inserted in the end of the hose, and the ring E is brought to proper position to clasp the end portion of the hose around the nipple, then the binding-nut F is moved forward into engagement with the threaded portion of the coupling-head, and as the nut is screwed home thereon its interior bevel $f'$ rides upon the exterior bevel $e^2$ of the ring E, so that the latter is caused to contract and hug or grip the hose and clamp it absolutely around the nipple, the hose being moreover caught between the corrugations $d$ and $e$, so that there is no likelihood of separation of the hose from the coupling-head by reason of the pulling strain exerted on the hose by the internal pressure. At the same time, the end of the hose being already in place and engaged between the nipple and the elastic ring before contraction of the latter, and the screwing up of the nut having only the effect of contracting the ring so as to compress the hose around the nipple, the clamping of the hose is effected without injury thereto, such as is inevitably incident to the prior devices alluded to; while there is no tendency to cut or mutilate the hose or its rubber lining between the coacting surfaces of the ring and nipple, and hence the usual danger of rupture or even of blowing off of the hose at the neck of the coupling-head under high internal pressure is absolutely obviated. Moreover, since the ring E simply contracts around the hose and compresses the same, the longitudinal movement of the nut while being screwed on to the coupling-head has no drawing or other effect upon the hose except to compress the same; thereby avoiding the usual fatal effects of buckling or bunching, fracturing and cutting, which inevitably result from drawing the end of the hose between the toothed surfaces of the usual wedge and outer binding-member in order to effect engagement under compression. It will be further noted that the retaining-ring E is inwardly slightly flaring or beveled or tapered at its rear or outer end, as indicated at $e^3$. This is to produce a gradual compression around the neck of the hose so as to allow flexibility thereof and avoid the abrupt compression which is usual around the neck or at the juncture between the hose and hose-binder which both weakens and stiffens the hose to such an extent as to increase the liability of breaking or rupture. The nut F is shown having oppositely disposed apertures $f^2$ to receive a spanner wrench for screwing and unscrewing the same.

The larger portions of the coupling-heads are formed with interior enlarged annular chambers or recesses $A^2$, adapted to provide air-cushions around the stream of water flowing through the coupling, such cushions having the same beneficial effect upon the stream as the air-chamber of a pump, making a smoother and stronger stream.

It will be understood of course that the invention is susceptible of modification in details of construction and arrangement, and of embodiment in other forms or in connection with other styles of coupling-members than those illustrated herein, so that I do not desire to be limited to the specific embodiment shown or any specific details of construction.

Having thus fully described my invention, what I claim as new and desire to secure by Letters Patent of the United States is:—

1. A hose-coupler comprising a coupling-head having an exteriorly screw-threaded boss and having also a nipple for insertion into the end of a hose-section, a split ring having interior helical corrugations and having also an exterior bevel, and a binding-nut having an interior bevel similar to and adapted to coact with that of the split ring, the binding-nut having also interior screw-threads for engaging the threaded boss of the coupler-head, the helical corrugations of the split ring enabling it to be screwed upon the hose inward from its end and afterward screwed back onto the end portion of the hose which surrounds the nipple, the binding nut contracting the split ring upon the hose to clamp the latter upon the nipple, said binding nut not moving the ring along the hose.

2. In a hose-coupler, a coupling-head having a nipple for insertion into the end of a hose-section, a split ring having a beveled exterior and having its bore formed with an outwardly flaring rear end, and a binding nut screwing to the coupling head and having a beveled interior engaging said exteriorly-beveled ring to contact the latter to clamp the hose upon the nipple, the flare of the split ring preventing abrupt compression of the hose.

3. In a hose-coupler, a coupling-head having a nipple for insertion into the end of a hose-section and provided with an exterior spiral-thread engaging said hose-end, a split ring adapted to clamp the hose on said nipple and having a beveled exterior and having also an interior spiral thread adapted to approximately register with the spiral thread of the nipple for a portion of its length, and a binding-nut screwing to the coupling-head and having a beveled interior engaging said exteriorly-beveled ring to contract the latter to clamp the hose between the nipple and ring, the split ring abutting the coupling head to prevent a longitudinal movement of the ring during its contraction by the binding nut.

In testimony whereof I affix my signature, in presence of two witnesses.

CHRISTIAN E. LOETZER.

Witnesses:
A. M. PARKINS,
OSGOOD H. DOWELL.